No. 742,461.

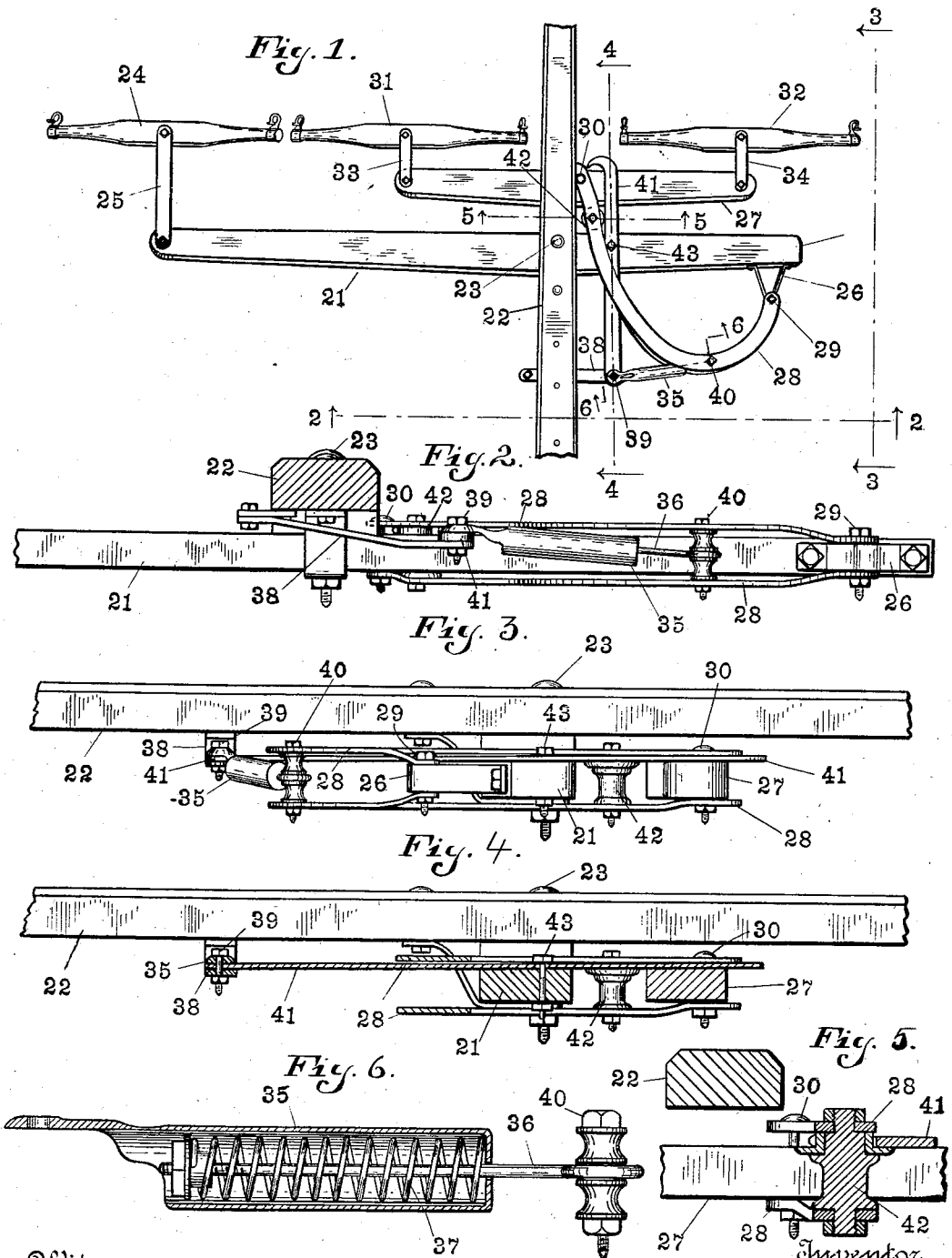

Patented October 27, 1903.

UNITED STATES PATENT OFFICE.

PETER E. LITTLE, OF DAYTON, OHIO.

DRAFT-EQUALIZER.

SPECIFICATION forming part of Letters Patent No. 742,461, dated October 27, 1903.

Application filed August 21, 1903. Serial No. 170,246. (No model.)

*To all whom it may concern:*

Be it known that I, PETER E. LITTLE, a citizen of the United States, residing at Dayton, in the county of Montgomery and State of Ohio, have invented certain new and useful Improvements in Draft-Equalizers, of which the following is a specification.

The object of my said invention is to produce a draft attachment whereby several animals may be so attached to a load as to equalize the work between them, as will be hereinafter more particularly described and claimed.

Referring to the accompanying drawings, which are made a part hereof, and on which similar reference characters indicate similar parts, Figure 1 is a plan view of a draft-equalizer embodying my said invention; Fig. 2, an elevation as seen from the dotted line 2 2 alongside Fig. 1; Fig. 3, a side elevation as seen from the dotted line 3 3 alongside Fig. 1; Fig. 4, a sectional view as seen from the dotted line 4 4 in Fig. 1; Fig. 5, a detail sectional view on the dotted line 5 5 in Fig. 1, and Fig. 6 a detail sectional view through the spring connection on the dotted line 6 6 in Fig. 1.

The draft-bar 21 is pivoted to the pole or tongue 22 by pivot-bolt 23. To its longer end in the arrangement shown a swingletree 24 is connected by means of link 25. To the other end, or to a bracket 26 thereon, a doubletree 27 is connected by means of long curved links 28 and pivots 29 and 30. To the ends of the doubletree 27 I connect the swingletrees 31 and 32 by means of links 33 and 34. The swingletrees and doubletrees shown in the drawings are the devices of ordinary construction commonly so designated. These may be varied at will, as the capability of the device is varied. I shall therefore at times use the term "draft-trees" as comprehensive of swingletrees, doubletrees, tripletrees, and the like.

The long curved links 28 are yieldingly connected to the tongue or pole 22, the means being the spring-case 35, the rod 36, and the spring 37, as best shown in Fig. 6, said spring-case being connected to link 38 by pivot-bolt 39 and the rod 36 being connected to the links 28 by pivot 40. The result is that the tongue or pole and the outer end of the draft-bar 21 are yieldingly connected together, so that as the end of the bar 21 which bears the bracket 26 is drawn ahead the spring 37 is compressed, and the resistance increases. When, therefore, in the arrangement shown the two animals attached to the doubletree pull more strongly than the single animal attached to the swingletree 24, it is compensated for or equalized by this additional resistance transmitted from the pole through this yielding connection.

Between the two members of the link 28 a roller 42 is secured. In case the horses attached to the doubletree advance too much ahead of the horse attached to the swingletree 24, the hook on the end of the bar 41 will come against this roller 42, which locks the structure and transfers the pulling-point of the two horses (from the pivot 29) to the pivot 43, which unites the bar 41 and the draft-bar 21, as will be readily understood. On the other hand, if the horse attached to the swingletree 24 advances ahead of the two horses attached to the doubletree then the result will be to reduce the tension on the spring 37, thus giving the two horses the advantage of this reduced resistance at this point.

I have shown and described my improved draft-equalizer arranged for use with three animals, and have consequently shown an ordinary doubletree carrying two swingletrees connected to one end of the draft-bar and one swingletree connected to the other; but the device may be readily arranged to be used with a different number of animals, if desired, and I do not limit myself to any particular number so long as the essential features of my invention are retained.

Having thus fully described my said invention, what I claim as new, and desire to secure by Letters Patent, is—

1. The combination, in a draft-equalizer, of a pole, a draft-bar pivoted thereto, a draft-tree, a curved link extending from behind the draft-bar forward to in front thereof and connecting the same to the draft-tree, a yielding connection between said link and the pole, a hook-bar extending forward from the connection with said yielding connection and connected with the draft-bar and provided with a hooked end, and a contact-point carried by the curved links adapted to engage with said hooked ends as the team attached to the draft-tree advances.

2. The combination, in a draft-equalizer, of a draft-bar, a draft-tree, connections between said draft-bar and said draft-tree, a stop-bar, and a contact carried by the connections between the draft-bar and the draft-tree which will engage with the stop-bar when the draft-tree is unduly advanced.

3. The combination, in a draft-equalizer, of a pole, a draft-bar pivoted thereto, draft-trees connected to said draft-bar, and a laterally-disposed yielding connection between the pole and one of the draft-tree connections, whereby when the draft-tree thus connected is advanced relatively to the other an increased resistance is produced by the strain on the yielding device.

In witness whereof I have hereunto set my hand and seal, at Dayton, Ohio, this 17th day of August, A. D. 1903.

PETER E. LITTLE. [L. S.]

Witnesses:
 ROBT. C. PATTERSON,
 EDITH BANKER.